July 14, 1959

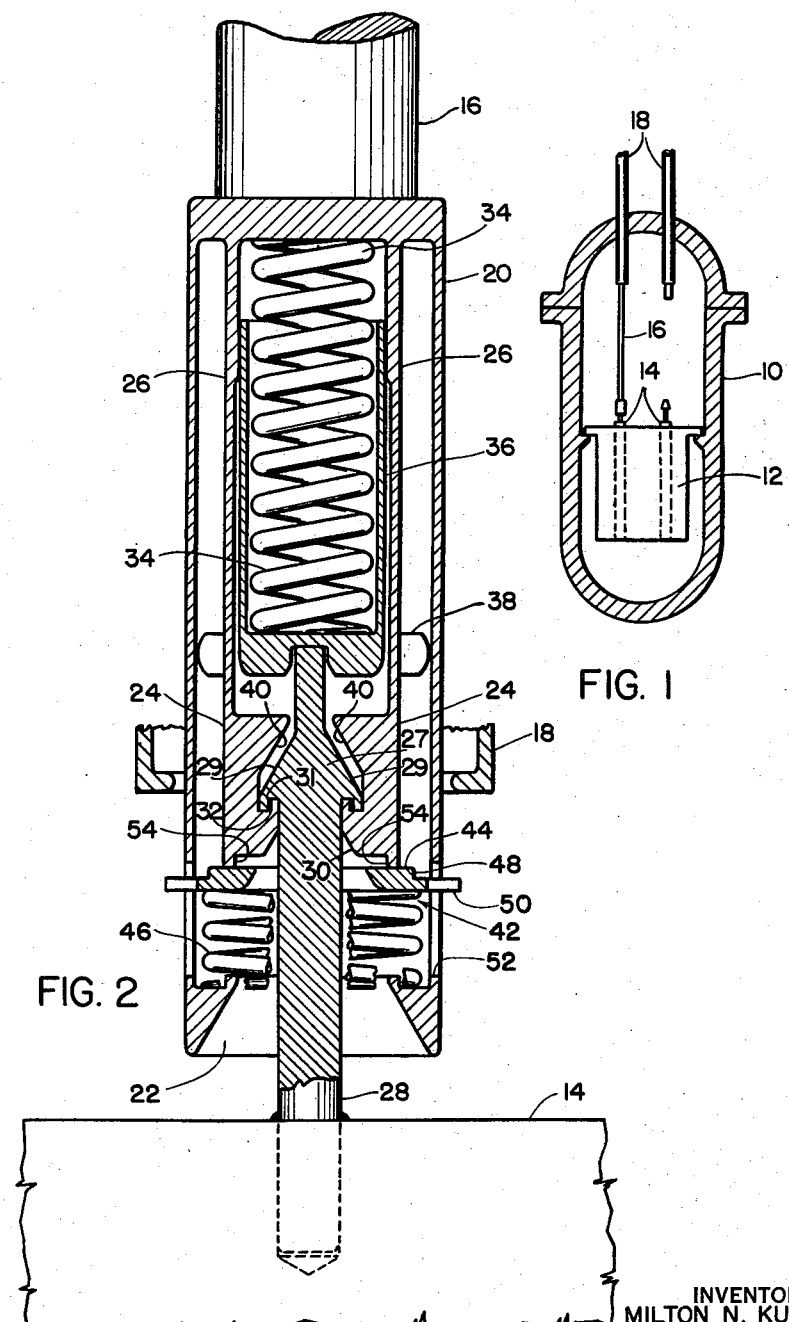

M. N. KUSHNER ET AL 2,894,779

AUTOMATIC COUPLING

Filed March 6, 1956

INVENTORS:
MILTON N. KUSHNER
ROBERT A. CHAPELLIER
BY
Eldon H. Luther
ATTORNEY 2,894,779

Patented July 14, 1959

2,894,779

AUTOMATIC COUPLING

Milton N. Kushner, Valley Stream, and Robert A. Chapellier, Whitestone, N.Y., assignors to Combustion Engineering, Inc., New York, N.Y., a corporation of Delaware Application March 6, 1956, Serial No. 569,924

11 Claims. (Cl. 294—83)

This invention relates to coupling devices for releasably securing together two separate members and has particular relation to such devices wherein the coupling and uncoupling action is automatic and obtained by means of axial movement only of the coupling members.

There are many instances, particularly in industrial operations, wherein it is necessary to obtain an automatic coupling action with the coupling and uncoupling being accomplished solely through relative axial movement of the elements of the coupling. Such a coupling action is required in connection with certain processes that take place within a pressure vessel where it is necessary to move and/or deposit structural or other elements at various locations in the vessel and for the purpose of explanation the invention will be described in such an environment although it is to be understood that this is by way of explanation only for the invention may obviously be used in other and different environments.

In accordance with the present invention there is provided a housing which may be secured to one end of an actuating rack for an element or member positioned within a pressure vessel with the rack being movable in an axial direction and when coupled to the member being effective to move the same in the axial direction. The other end of this housing is open for inserting a connector or keeper axially therewithin with the connector being secured to this element or member and provided with a camming head. Within the housing there is provided oppositely disposed locking jaws which are radially movable and are spring biased to a predetermined radial position so that they lie within the path of the connector. Upon inserting the connector a certain distance within the housing the camming head is effective to cam these jaws outwardly until it reaches a predetermined position whereupon the jaws snap behind this camming head and thereby lock the connector within the housing. When the connector is in this locked position a suitable spring means, disposed within the housing, bears against the inner end of the connector thereby urging the connector and the locking jaws into engagement or locking relation. Upon further insertion of the connector into the housing the clamping jaws are caused to move radially outward a distance sufficient to permit free and unobstructed withdrawal of the connector from the housing. Upon being moved to this radial outward position a locking washer which is urged by a suitable spring into engagement with the lower end of the locking jaws becomes effective to retain or lock the jaws in this radial outward position with the locking jaws having outwardly extending lips receivable behind a shoulder formed on the washer for effecting this locking action. With the jaws retained in their radial outward position in this manner free withdrawal of the connector is permitted. After the connector is withdrawn the jaws may be released from this outward or unlocked position by moving the housing along its given path to a predetermined location where there is located a sleeve disposed exteriorly of the housing and effective to engage the locking washer and move it toward the outer end of the housing to release the jaws.

It is an object of this invention to provide an improved automatic coupling operable solely by means of axial movement of the coupling members and which is positive in its coupling and uncoupling operations.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

Fig. 1 is a diagrammatic illustration in the form of a vertical section of a pressure vessel within which a reaction is to take place at high pressure and showing suitable elements that are to be moved vertically within the vessel and actuating means therefor including the coupling of the present invention.

Fig. 2 is a longitudinal section view of the connector of the present invention showing it in the connected position where the connector or keeper is prevented from being withdrawn from the housing.

Figure 3:
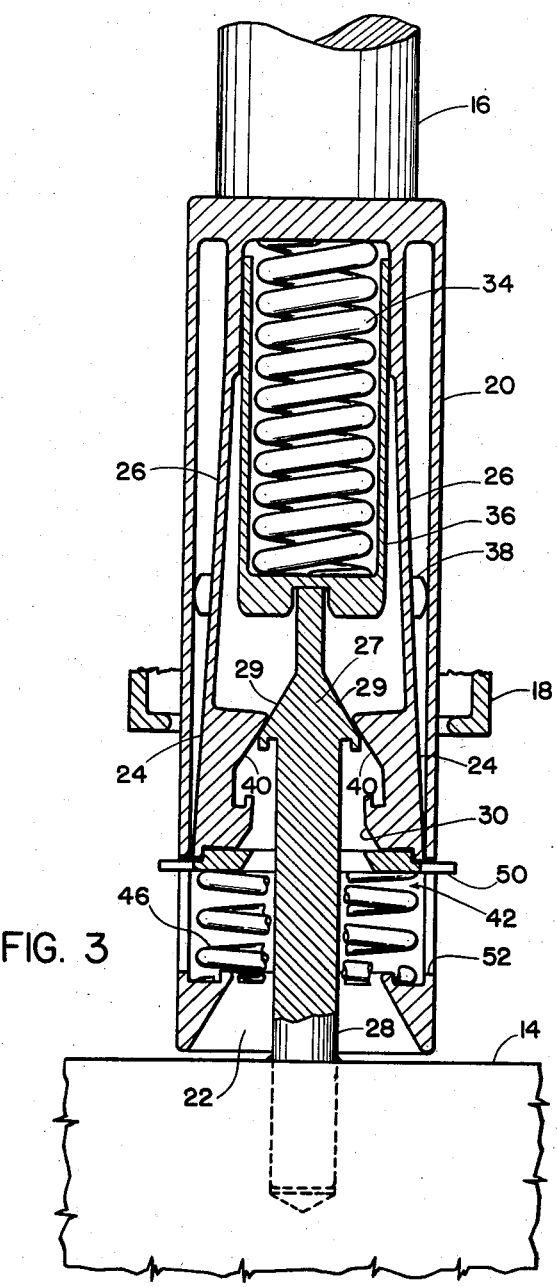
Fig. 3 is a view similar to that of Fig. 2 but showing the relative position of the elements of the coupling immediately after the jaws have been moved to their unlocked or releasing position.

Referring now to the drawing, wherein like reference characters are used throughout to designate like elements, there is shown therein a vessel 10 such as may be provided for any desired reaction to be conducted under high pressure and within which is provided containment member 12. Extending into this member 12 are numerous elements 14, as for example catalyzers for a process, which are adapted to be moved in and out of this member and for this purpose actuating mechanism extends through the cover of the vessel with this mechanism illustratively taking the form of actuating racks 16 moved up and down by mechanism not disclosed and positioned within suitable sleeves 18 which are secured to and extend through the upper end of the vessel. Since it may be necessary to have unobstructed access into the interior of the vessel while the elements 14 are fully inserted within the member 12 it is required that the actuating racks 16 be coupled to the element 14 in a manner which permits them to be disconnected therefrom without entrance into the vessel. This result is accomplished by applicants' automatic coupling.

As embodied the coupling includes cylindrical housing or body 20 the upper end of which is secured to the lower end of actuating rack 16 and the lower end of which is provided with a chamfered opening 22. Positioned within housing 20 are a pair of preferably arcuate locking jaws 24 which are in opposite relation to each other and are symmetrically arranged with respect to the axis of the housing. These locking jaws are supported from the upper end of the housing by means of spring arms 26 which are effective to urge the locking jaws a predetermined radial position, shown in Fig. 2, while permitting the jaws to move radially outward within the housing.

Axially insertable within housing 20 is the connector or keeper 28 which is preferably in the form of a cylindrical rod provided adjacent its upper end with an enlarged head portion 27 forming conical camming surface 29 and an outwardly facing shoulder 31. The chamfer of opening 22 facilitates insertion of the connector into housing 20 even though the two may be slightly misaligned. Adjacent the outer end of locking jaws 24 is provided camming surface 30 which is complementary with camming surface 29 of connector 28 and is engaged by this latter camming surface upon insertion of the connector into housing 20. These camming surfaces are therefore effective to move the locking jaws radially outward as the connector is inserted into the housing until it reaches a predetermined distance where the jaws snap behind the head formed on the keeper and the outwardly facing shoulder 31 is in overlying relation with the complementary shoulder 32 provided on the locking jaws with these shoulders including lips that are in telescoping relation with the jaws 24 with the lip of shoulder 31 being positioned behind that of shoulder 32.

In order to insure that the complementary shoulders 31 and 32 remain in engagement upon sudden and rapid downward movement of housing 20, spring 34 is provided within the housing with the upper end of this spring bearing against the top of the housing and the lower end being received in and bearing against sleeve 36 which is disposed between spring arms 26 and is provided with radially extending guide members 38 in engagement with the wall of the housing. The lower end of sleeve 36 is recessed to receive the upper end of connector 28 and spring 34 is so proportioned that when the connector is in its locked position with relation to jaws 24, as depicted in Fig. 2, the spring exerts a predetermined force upon the connector urging shoulders 31 and 32 into engagement.

Connector 28 is released from its locking position with relation to jaws 24 by inserting the connector a further distance into housing 20 to bring camming surface 29 into engagement with the complementary surfaces 40 provided on the locking jaws thereby moving these jaws radially outwardly with this being accomplished in the illustrative organization of Fig. 1 by continuing to move actuating rack 16 downward after element 14 is fully inserted into member 12 as to prevent it from moving further downward. Surfaces 40 are disposed so that by inserting the connector a predetermined distance within housing 20 the jaws 24 will be moved radially outward a sufficient distance to permit unobstructed withdrawal of the connector from the housing with Fig. 3 showing the connector so inserted to accomplish this result. In order to prevent head portion 27 of the connector from being inserted into housing 20 past locking jaws 24 the surfaces 40 extend inwardly a sufficient distance so that when locking jaws 24 are moved radially outward as far as possible where they contact the wall of housing 20, these surfaces 40 obstruct further insertion of the connector into the housing.

When locking jaws 24 are moved to their unlocked or releasing position with relation to connector 28 by the action of complementary camming surfaces 40 and 29 the jaws are retained in this releasing position by means of the spring pressed lock 42 so that connector 28 may be withdrawn from the housing. This lock includes washer 44 which is biased to or urged against the lower end of locking jaws 24 through the action of spring 46. The radial outer portion of the washer is relieved to provide shoulder 48 and fingers 50 are provided on the washer and extend out through slots 52 formed in the housing 20. The lower end of locking jaws 24 are provided with lips 54 which are received in back of shoulder 48 of the locking washer when the jaws are moved to their unlocked or releasing position with this releasing position of the elements of the invention being shown in Fig. 2.

When jaws 24 are retained in their radial outward position by lock 42 connector 28 may be freely withdrawn from housing 20 and both spring 34 and the action of or reaction from camming surfaces 40 tending to move the connector from housing 20 with there being no frictional forces or other restricting forces tending to resist the withdrawal of the connector from the housing and with the connector being permitted to be freely withdrawn without contacting the locking jaws thereby insuring that the members will be uncoupled.

In order to release locking jaws 24 from this radial outward position in which they are retained by lock 42 the inner end of sleeve 18 through which the actuating rack 16 extends is disposed so that upon elevating the rack and accordingly housing 20 to a position adjacent the upper end of vessel 10 this sleeve contacts the outwardly extending fingers 50 of washer 44 moving the washer toward the open end of the housing against the force of spring 46 and releasing the jaws for movement to their radial inward position under the action of spring arms 26 where they may again effect a coupling action with connector 28.

It will thus be seen that with the present invention the coupling action is automatically obtained through only axial movement of the members and that both positive coupling and uncoupling of the members is assured.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. In an organization of the type described the combination of a movable body member moved along a given path and having locking jaws biased to a locking position, a keeper insertable in said body member and when inserted a predetermined distance lockingly engaging the jaws, means operative in response to insertion of said keeper a further distance to move said jaws against their bias to an unlocking position with respect to said keeper, locking means independent of said keeper and responsive to the positioning of the jaws in said unlocking position to retain said jaws in said unlocking position after being so moved by said means to permit free withdrawal of said keeper from said jaws, and means disposed along the path of movement of the body member operative in response to movement of the member therealong to engage said locking means and move it to a position where it is ineffective to retain said jaws in said unlocking position.

2. The organization of claim 1 including a spring pressed member engaged by said keeper and effective to urge the keeper into locking engagement with said jaws.

3. An automatic coupler comprising a body member moved along a given path, a connector secured to a member to be moved and insertable within said body member laterally movable locking members forming a part of said body member and resiliently biased to a predetermined lateral position, said locking members automatically engaging said connector to prevent withdrawal of the same from the body member upon insertion of the connector a predetermined distance within the body member, cam means operative to laterally move said locking members to an unlocked position with respect to said connector in response to insertion of said connector a predetermined further distance within said body member, locking means automatically operative solely in response to the positioning of the locking members in their unlocked position to retain said locking members in their unlocking position when so moved to permit free withdrawal of the connector from the body member and means independent of said connector and disposed at a given location along said path operative to release said locking members from said unlocked position.

4. The organization of claim 3 wherein the means operative to move the locking members to an unlocked position with respect to said connector in response to insertion of said connector a predetermined further distance within said body member comprises a pair of coacting cams that become engaged upon this further insertion and cam the locking members to their unlocked position where they are retained by the locking means, said cams being disposed as to impart a reactive force upon the connector to urge it from said housing and locking members and being so effective when the locking members are in their unlocked position and the locking means is effective to retain them in this position.

5. A coupling device comprising a housing movable along a given path and carrying a plurality of locking members symmetrically disposed about the axis of said movement, movable in a generally radial direction relative thereto and biased to a predetermined locking position, a connector insertable between said locking members along said axis, said connector and locking members having complementary shoulders preventing withdrawal of the connector from the locking member when in overlying relation and disposed so that they are in overlying relation when the connector is inserted a predetermined distance into the housing, camming surfaces on said locking members and said connector engageable upon insertion of the connector between the locking members to cam the locking members from their predetermined locking position and permit insertion of the connector said predetermined distance to a position where said shoulders are in overlying relation, means operable in response to insertion of said connector a predetermined distance beyond said position to laterally move said locking members to an unlocked position relative to said connector where said shoulders are laterally displaced and locking means biased to a locking position relative to said locking members operative to retain them in their unlocked position when so moved by said connector to permit free removal of the connector therefrom, and means independent of said connector operative in response to movement of said housing to a predetermined location along said path to move said locking means against its bias to a position where it is ineffective to retain said locking members in their unlocked position.

6. An automatic coupling device comprising an elongated housing open at one end, a plurality of locking jaws mounted within the housing in symmetrical relation about the longitudinal axis thereof and radially movable therewith, said jaws being spring biased to a predetermined radial position and provided with an inwardly facing shoulder and an outwardly facing camming surface, a connecting member insertable into said housing through said open end and having a camming head adapted to engage the camming surface formed on said jaws to cam said members radially outward to permit the camming head to snap into locked relation behind said inwardly facing shoulder, means within the housing contacting said connecting member when in its locked position behind said shoulder operable to urge it into engagement with said shoulder, means operative upon further insertion of the connecting member into the housing to move the locking jaws radially outward sufficiently to permit free withdrawal of the connecting member from the housing, a lock, spring pressed against the outer end of the jaws, and effective to retain said jaws in this outward position when so moved by the connecting means and means independent of the connecting member and disposed exteriorily of said housing engageable with said lock to render the same ineffective to so retain said jaws.

7. The organization of claim 6 wherein the locking jaws are supported from the end of the housing opposite said open end on elongated spring arms.

8. The organization of claim 6 wherein the means operative upon further insertion of the connecting member into the housing to move the locking jaws radially outward comprises an additional camming surface provided on the locking jaws disposed inwardly of the shoulder formed thereon and engageable by the camming head of the connector.

9. The organization of claim 8 wherein these additional camming surfaces are effective to prevent insertion of the connector into the housing beyond a predetermined distance.

10. A coupling device comprising a cylindrical housing open at one end and movable along a given path, a pair of opposed arcuate locking jaws within said housing symmetrically arranged about the axis thereof and mounted from the other end of the housing on elongated spring arms that are effective to bias the jaws to a predetermined radial position but permitting radial movement thereof, each of said jaws having an outwardly extending lip at its outer end, a camming surface adjacent its outer end and facing radially inwardly, and an inwardly facing shoulder disposed inwardly of the camming surface and extending radially outward from the radial inner portion of the jaws, a connector adapted to be inserted into the housing axially through the open end and having a camming head that has a surface complementary with the camming surface on said jaws and a shoulder complementary with the shoulders on said jaws, said head, upon insertion of the connector within the housing, being effective to cam the jaws radially outward so that at a predetermined distance said jaws snap behind the shoulder on said head with the complementary shoulders then preventing removal of the connector, spring means coaxial with the housing and interposed between said other end thereof and said jaws, said spring means being contacted by said connector and effective to urge said shoulders into engagement, means operative upon further insertion of said connector into said housing to move said jaws radially outward to a position which will permit free withdrawal of the connector from the housing, a washer in engagement with the outer end of said jaws and having an outwardly facing shoulder behind which the lips on the jaws are adapted to be positioned when said jaws are moved radially to their unlatching position to retain them in this position, spring means interposed between the washer and the open end of the housing to urge the washer toward said jaws, said washer extending radially outward of the housing, and means disposed exteriorly of the housing at a given location relative to said path of movement effective to engage said washer and move it from the locking position relative to said jaws.

11. The organization of claim 10 wherein said means for moving the jaws radially outward upon further movement of the connector into the housing comprises a radially inward facing camming surface provided on the jaws inward of said shoulder and in the path of the camming head on the connector.

References Cited in the file of this patent

UNITED STATES PATENTS

| 2,489,864 | Cravener | Nov. 29, 1949 |
| 2,577,994 | Bendeler et al. | Dec. 11, 1951 |